United States Patent
Yang et al.

(10) Patent No.: US 9,357,084 B2
(45) Date of Patent: May 31, 2016

(54) METHOD AND APPARATUS FOR MONITORING SERVICE USAGE OF A MOBILE TERMINAL

(71) Applicant: Tencent Technology (Shenzhen) Company Limited, Shenzhen (CN)

(72) Inventors: Lang Yang, Shenzhen (CN); Xiaoling Bei, Shenzhen (CN); Xunchang Zhan, Shenzhen (CN); Feijun Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/818,694

(22) Filed: Aug. 5, 2015

(65) Prior Publication Data

US 2015/0341504 A1    Nov. 26, 2015

Related U.S. Application Data

(63) Continuation of application No. PCT/CN2014/083015, filed on Jul. 25, 2014.

(30) Foreign Application Priority Data

Jul. 29, 2013   (CN) .......................... 2013 1 0323580

(51) Int. Cl.
*H04M 15/00* (2006.01)
*H04M 15/30* (2006.01)
*H04W 4/24* (2009.01)

(52) U.S. Cl.
CPC ............. *H04M 15/80* (2013.01); *H04M 15/30* (2013.01); *H04M 15/58* (2013.01); *H04M 15/60* (2013.01); *H04M 15/745* (2013.01); *H04M 15/77* (2013.01); *H04M 15/771* (2013.01); *H04M 15/774* (2013.01); *H04M 15/805* (2013.01); *H04M 15/8044* (2013.01); *H04W 4/24* (2013.01)

(58) Field of Classification Search
CPC ............ H04W 4/02; H04W 4/22; H04W 4/24
USPC ....................... 455/406–408, 414.1
See application file for complete search history.

(56) References Cited

U.S. PATENT DOCUMENTS

2015/0220999 A1*   8/2015   Thornton ........... G06Q 30/0201
                                                        705/14.66

FOREIGN PATENT DOCUMENTS

| CN | 101262676 A | 9/2008 |
| CN | 102111743 A | 6/2011 |
| CN | 103002466 A | 3/2013 |

OTHER PUBLICATIONS

Tencent Technology, ISRWO, PCT/CN2014/083015, Oct. 21, 2014, 8 pgs.

*Primary Examiner* — Harry S Hong
*Assistant Examiner* — Sam Bhattacharya
(74) *Attorney, Agent, or Firm* — Morgan, Lewis & Bockius LLP

(57) ABSTRACT

Method and device of monitoring service usage are disclosed. The method includes: acquiring respective service plan information of a first service plan and a second service plan for a service offered by one or more service providers, the respective service plan information for each of the first and second service plans including a respective set of service variables; acquiring respective values for the respective sets of service variables for the first and second service plans based on actual service usage associated with a user; in accordance with the acquired respective values, generating a first service score for the first service plan and a second service score for the second service plan; and in accordance with the first and second service scores, selecting a respective service plan for at least one of usage recommendation or fee calculation for subsequent use in a current service cycle.

17 Claims, 10 Drawing Sheets

METHOD AND APPARATUS FOR MONITORING SERVICE USAGE OF A MOBILE TERMINAL

RELATED APPLICATIONS

This application is a continuation application of PCT Patent Application No. PCT/CN2014/083015, entitled "METHOD AND APPARATUS FOR MONITORING SERVICE USAGE OF A MOBILE TERMINAL" filed on Jul. 25, 2014, which claims priority to Chinese Patent Application No. 201310323580.3, entitled "METHOD AND APPARATUS FOR MONITORING NETWORK USAGE OF A MOBILE TERMINAL" filed on Jul. 29, 2013, both of which are incorporated by reference in their entirety.

FIELD OF THE TECHNOLOGY

The disclosed implementations relate generally to mobile terminal technologies, and in particular, to a method and an apparatus for monitoring service usage of a mobile terminal.

BACKGROUND OF THE TECHNOLOGY

With the popularity of mobile terminals such as smart phones and tablet computers, mobile Internet access is increasingly accepted by people as a practical function of the mobile terminals. At present, telecom carriers and other service providers provide various service plans. For example, in a service plan, a user prepays a fixed amount each month and then can use data with an upper limit. For example, a user prepays a basic 5 dollar charge and then can use up to 200 M (megabyte) data in a month. In the month, if the final data used by the user each month is less than or equal to the maximum value of the package, the user only needs to pay the normal rate package charge. However, once the final service used by the user each month exceeds the upper limit of the package, the excess part of the service exceeding the upper limit of the package is billed as overcharge. Generally, the charge of the excess part of the service is at a much higher rate than the charge of the normal usage of the package.

In addition, the operators provide various kinds of service plans that can be used together. For example, when the user orders the discount hour package and the normal rate package at the same time, the service used from 0:00 to 10:00 each day is billed by the operator according to the discount hour package, while the service used in the residual time is billed according to the normal rate package. The existing service statistics collection software can only collect total usage; when the user uses multiple traffic packages at the same time, the statistical result is unclear, so that the user cannot correctly obtain the service usage information. Therefore, the existing service usage monitoring technology of the mobile terminal lacks accuracy.

The day to day decisions of many users have to deal with would be more complex than the above example. Normally, a service plan can be quite complicated, and when several plans combined together, they are confusing to users. The situation can be much more complicated when travelling or international phone calls are involved. Therefore, it is desirable to have a method and device that helps the user to monitor each service plan and simplify the decision making process.

SUMMARY

In accordance with some implementations of the disclosed technology, a method of monitoring service usage is performed at a device having one or more processors and memory storing instructions for execution by the one or more processors. The method includes: acquiring respective service plan information of a first service plan and a second service plan for a service offered by one or more service providers, the respective service plan information for each of the first and second service plans including a respective set of service variables; acquiring respective values for the respective sets of service variables for the first and second service plans based on actual service usage associated with a user; in accordance with the acquired respective values, generating a first service score for the first service plan and a second service score for the second service plan; and in accordance with the first service score and the second service score, selecting a respective one of the first and second service plans for at least one of usage recommendation or fee calculation for subsequent use in a current service cycle.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To further illustrate the technical means used in the present application to achieve the technology purpose and further illustrate the effects, the specific implementations manners, structure, features, and effects of the present application are described in detail below with reference to the accompanying drawings and the preferred embodiments.

In accordance with some embodiments, a method for monitoring service usage of a mobile terminal can be applied to a mobile terminal such as a smart phone, a palmtop, or a tablet computer, so as to monitor the service usage of the mobile terminal.

Figure 1:
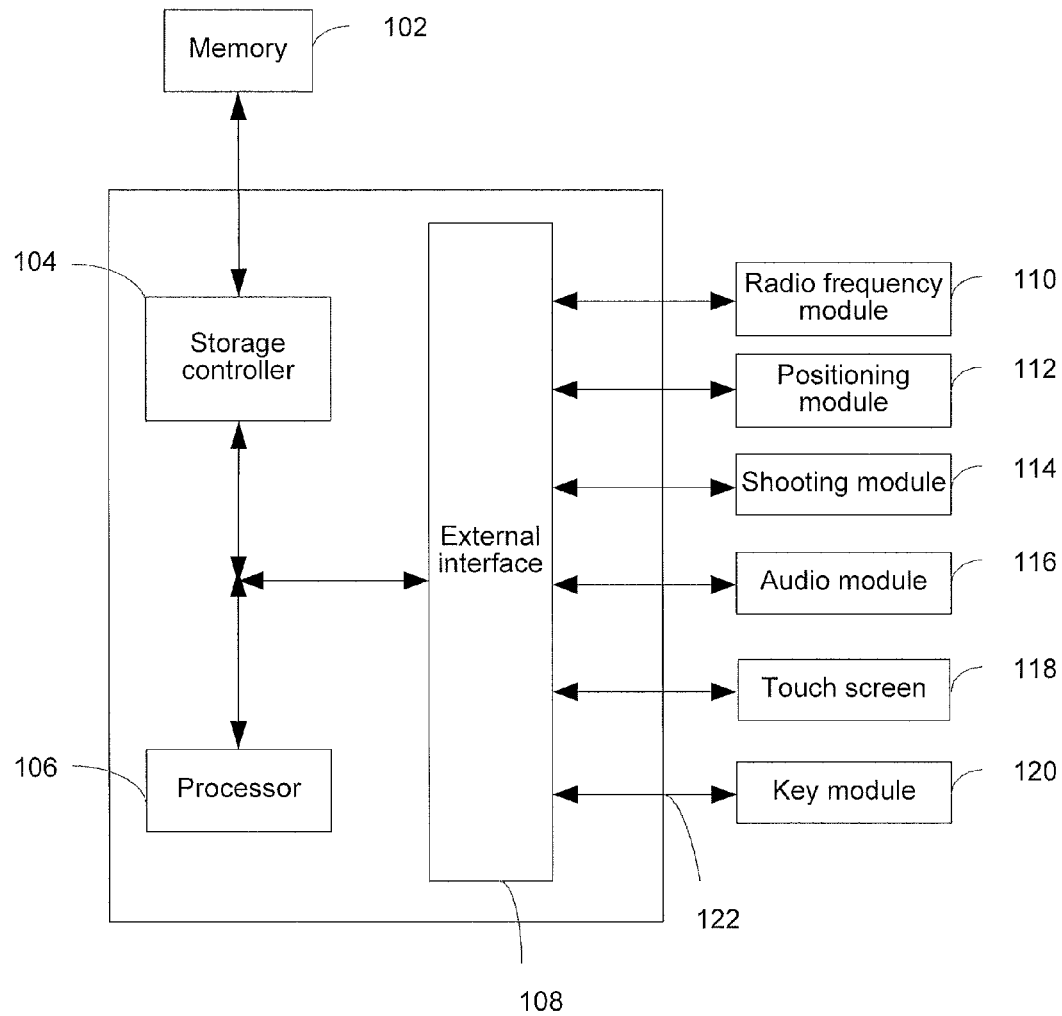
FIG. 1 is a structural block diagram of a mobile terminal.

FIG. 1 is a structural block diagram of a mobile terminal. As shown in FIG. 1, the mobile terminal 100 includes a memory 102, a storage controller 104, one or more (only one processor is shown) processors 106, an external interface 108, a radio frequency module 110, a positioning module 112, a shooting module 114, an audio module 116, a touch screen 118, and a key module 120. These components communicate with each other through one or more communication buses/signal lines 122.

In some embodiments, FIG. 1 merely shows a schematic structure, and the mobile terminal 100 may further include more or less components than the components shown in FIG. 1, or has configurations different from the configurations shown in FIG. 1. The components shown in FIG. 1 may be implemented by using hardware, software, or a combination thereof.

The memory 102 is used to store a software program and module, such as a program instructions/modules corresponding to a method and an apparatus for monitoring service usage of the mobile terminal; the processor 102 executes different function applications and performs data processing by operating the software programs and modules stored in the memory 104, thereby implementing the method for monitoring service usage of the mobile terminal.

The memory 102 may include a high-speed random memory, and may also include a nonvolatile memory such as one or more magnetic storage devices, a flash memory, or another nonvolatile solid-state memory. In some embodiments, the memory 102 may further include remotely disposed memories corresponding to the processor 106, and these remote memories may be connected to the mobile terminal 100 through a network. The network includes but is not limited to, for example, Internet, an intranet, a local area network, a mobile communication network, or a combination thereof. The processor 106 and another possible component may access the memory 102 under the control of the memory controller 104.

The external interface 108 is used to couple various input/output devices to a CPU and the memory 102. The processor 106 operates different software and instructions inside the memory 102, so as to execute different functions of the mobile terminal 100 and perform data processing.

In some embodiments, the external interface 108, the processor 106, and the storage controller 104 may be implemented by a single chip. In some other embodiments, they may be separately implemented by an independent chip.

The radio frequency module 110 is used to receive and send an electromagnetic wave, and implement mutual conversion between the electromagnetic wave and an electric signal, so as to communicate with a communication network or another device. The radio frequency module 110 may include various existing circuit elements for executing these functions, such as an antenna, a radio frequency transceiver, a digital signal processor, a cipher/decipher chip, a Subscriber Identity Module (SIM) card, and a memory. The radio frequency module 110 may communicate with various networks such as Internet, an intranet, and a wireless network, or communicate with other devices through the wireless network. The wireless network may include a cellular telephone network, a wireless local area network, or a metropolitan area network. The wireless network may use various communication standards, protocols, and technologies, which include but are not limited to, Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (for example, US Institute of Electrical and Electronic Engineers IEEE 802.11a, IEEE 802.11b, IEEE 802.11g and/or IEEE 802.11n), Voice over Internet Protocol (VoIP), Worldwide Interoperability for Microwave Access (Wi-Max), other protocols for e-mail, instant messaging, and short messages, and any other appropriate communication protocols; and even include some undeveloped protocols.

The positioning module 112 is used to acquire the current location of the mobile terminal 100. The positioning module 112 includes but is not limited to, for example, a Global Position System (GPS) or a positioning technology based on the wireless local area network or the mobile communication network.

The shooting module 114 is used to take a picture or shoot a video. The shot picture or video is stored in the memory 102, and is sent by the radio frequency module 110.

The audio module 116 provides audio interfaces for the user, and includes one or more microphones, one or more loudspeakers, and an audio circuit. The audio circuit receives audio data from the external interface 108, converts the audio data into electric information, and transmits the electric information to the loudspeaker. The loudspeaker converts an electric signal into an acoustic wave audible to the human ear. The audio circuit further receives the electric information from the microphone, converts the electric information into audio data, and transmits the audio data to the external interface 108 for further processing. The audio data may be acquired from the memory 102 or by the radio frequency module 110. In addition, the audio data may also be stored in the memory 102 or send by the radio frequency module 110. In some embodiments, the audio module 116 may further include an earphone jack, for providing an audio interface for an earphone or another device.

The touch screen 118 provides an output and input interface between the mobile terminal 100 and the user. Specifically, the touch screen 118 displays a video output to the user, and content of the video output may include characters, graphs, videos, or any combination thereof. Some output results correspond to some user interface objects. The touch screen 118 further receives input of the user, such as tapping, sliding, or other gesture operations of the user, so that the user interface object responds to the input of the user. The technology for detecting the input of the user may be resistance-type touch detection technology, capacitive touch detection technology, or any other possible touch detection technologies. A display unit of the touch screen 118 includes but is not limited to, for example, a liquid crystal display or a light-emitting polymer display.

The key module 120 also provides an interface for the user to input information to the mobile terminal 100, and the user presses different keys to enable the mobile terminal 100 to execute different functions.

Figure 2:
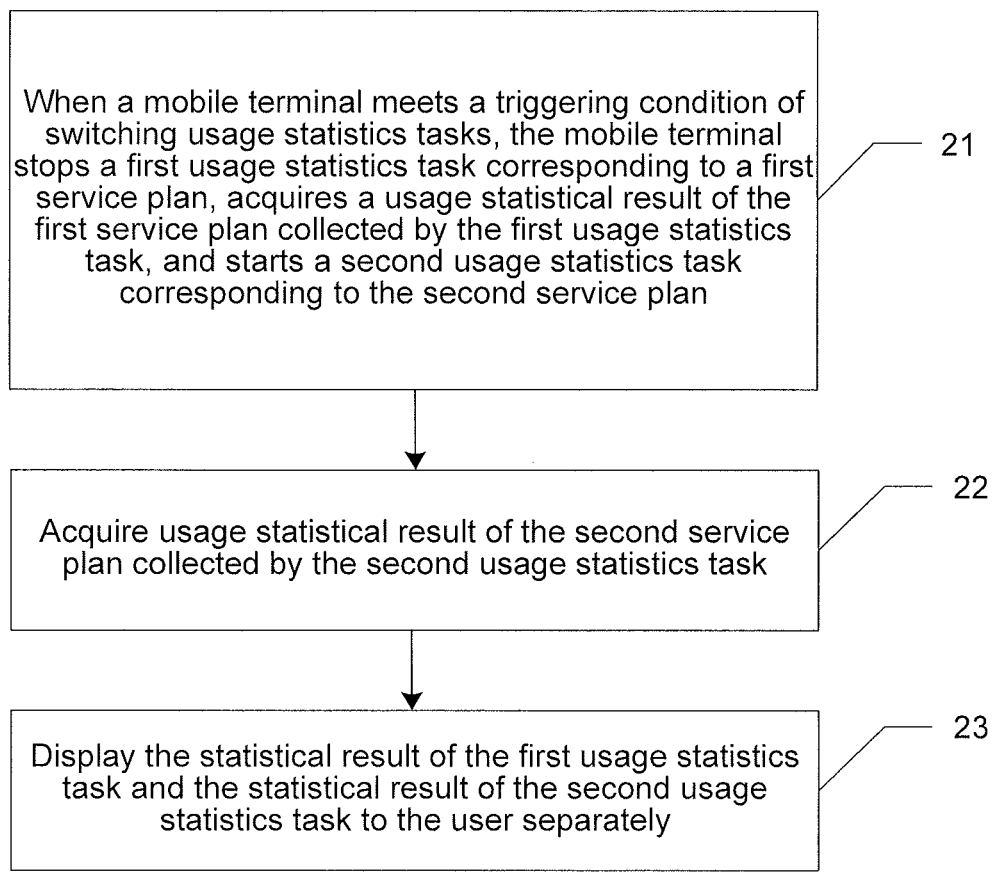
FIG. 2 is a flowchart of a method for monitoring service usage of the mobile terminal in accordance with some embodiments.

FIG. 2 is a flowchart of a method for monitoring service usage of a mobile terminal in accordance with some embodiments. As shown in FIG. 2, in some embodiments, the method for monitoring service usage of the mobile terminal includes the following steps.

Step 21: in accordance with some embodiments, when the mobile terminal meets a triggering condition of switching usage statistics tasks, the mobile terminal stops a first usage statistics task corresponding to a first service plan, acquires a service usage statistical result of the first service plan collected by the first usage statistics task, and starts a second usage statistics task corresponding to the second service plan.

Specifically, when the mobile terminal meets the triggering condition of switching the usage statistics task, first, the mobile terminal stops the first usage statistics task corresponding to the first service plan, and updates the statistical result of the first usage statistics task to a first statistical log. Then, the mobile terminal starts the second usage statistics task corresponding to the second service plan, reads, from a memory, a second statistical log that is stored when the second usage statistics task is executed last time, acquires the current service usage of the mobile terminal, adds the acquired current service usage of the mobile terminal to the statistical result read from the memory and recorded in the statistical log, and uses the sum as a statistical result of the current second usage statistics task and updates the statistical result to the second statistical log.

In some embodiments, if the mobile terminal does not have the second statistical log, the mobile terminal establishes the second statistical log for the second usage statistics task, and sets a value of the statistical result of the second usage statistics task in the second statistical log to 0 by default. For example, when it is detected that the mobile terminal meets the triggering condition of switching the usage statistics task, the mobile terminal stops the execution of the first usage statistics task, updates the statistical result 10 M of the first usage statistics task to the first statistical log, and starts to execute the second usage statistics task; the mobile terminal reads the second statistical log from the memory, and acquires the current service usage of the mobile terminal; if the statistical result recorded in the second statistical log is 20 M (megabyte) and the current service usage of the mobile terminal is 5 M, the mobile terminal adds 20 M to 5 M, updates the sum 25 M to the second statistical log as the statistical result, and deletes the original statistical result 20 M from the second statistical log.

In some embodiments, when a billing period of each service plan ends, the mobile terminal performs zero clearing on the statistical result in each statistical log, and re-executes each usage statistics task corresponding to each service plan. For example, if the first service plan is a monthly package and the billing period is from 0:00 on the 5th of this month to 0:00 on the 5th of next month, the mobile terminal performs zero clearing on the statistical result in the first statistical log when detecting that the system time is later than 0:00 on the 5th of next month.

The current service usage of the mobile terminal may be acquired by monitoring a data interface of the mobile terminal. The data interface of the mobile terminal may include a WIFI interface, a GPRS interface, a 3G communication interface, or the like. The mobile terminal monitors the data interface corresponding to the service plan, and when detecting that a data transmission is generated at the data interface, the mobile terminal acquires the data traffic and uses it as the current service usage of the mobile terminal.

In some embodiments, when the execution of the current second usage statistics task ends, the mobile terminal continues to execute the stopped first usage statistics task. For example, it is assumed that the second service plan is a discount hour package, the billing period is from 0:00 to 10:00 am each day, and the corresponding execution time of the second usage statistics task is from 0:00 to 10:00 am currently; then, when it is detected that the system time is later than 10:00 am currently, the mobile terminal ends the current second usage statistics task and continues to execute the stopped first usage statistics task.

Step 22: in accordance with some embodiments, the mobile terminal acquires service usage statistical result of the second service plan collected by the second usage statistics task.

Specifically, the mobile terminal acquires the service usage statistical result of the second service plan collected by the second usage statistics task. In some embodiments, the statistical result of the first usage statistics task may also be acquired from the first statistical log.

Step 23: in accordance with some embodiments, the mobile terminal displays the statistical result of the first usage statistics task and the statistical result of the second usage statistics task to the user separately.

Specifically, the mobile terminal can display the statistical result of the first usage statistics task and the statistical result of the second usage statistics task to the user by means of multiple graphical interfaces, and the specific presentation modes of the multiple graphical interfaces may be the same or different. In this way, the user can correctly and clearly distinguish the usage of the service plans by means of the multiple graphical interfaces, thereby more effectively monitoring the service usage of the mobile terminal.

In some embodiments, this method is applicable to a case in which more than two service plans co-exist. In the case in which more than two service plans co-exist, steps of the method for monitoring service usage of the mobile terminal are similar to the foregoing steps, so the details are not described herein again.

Figure 3:
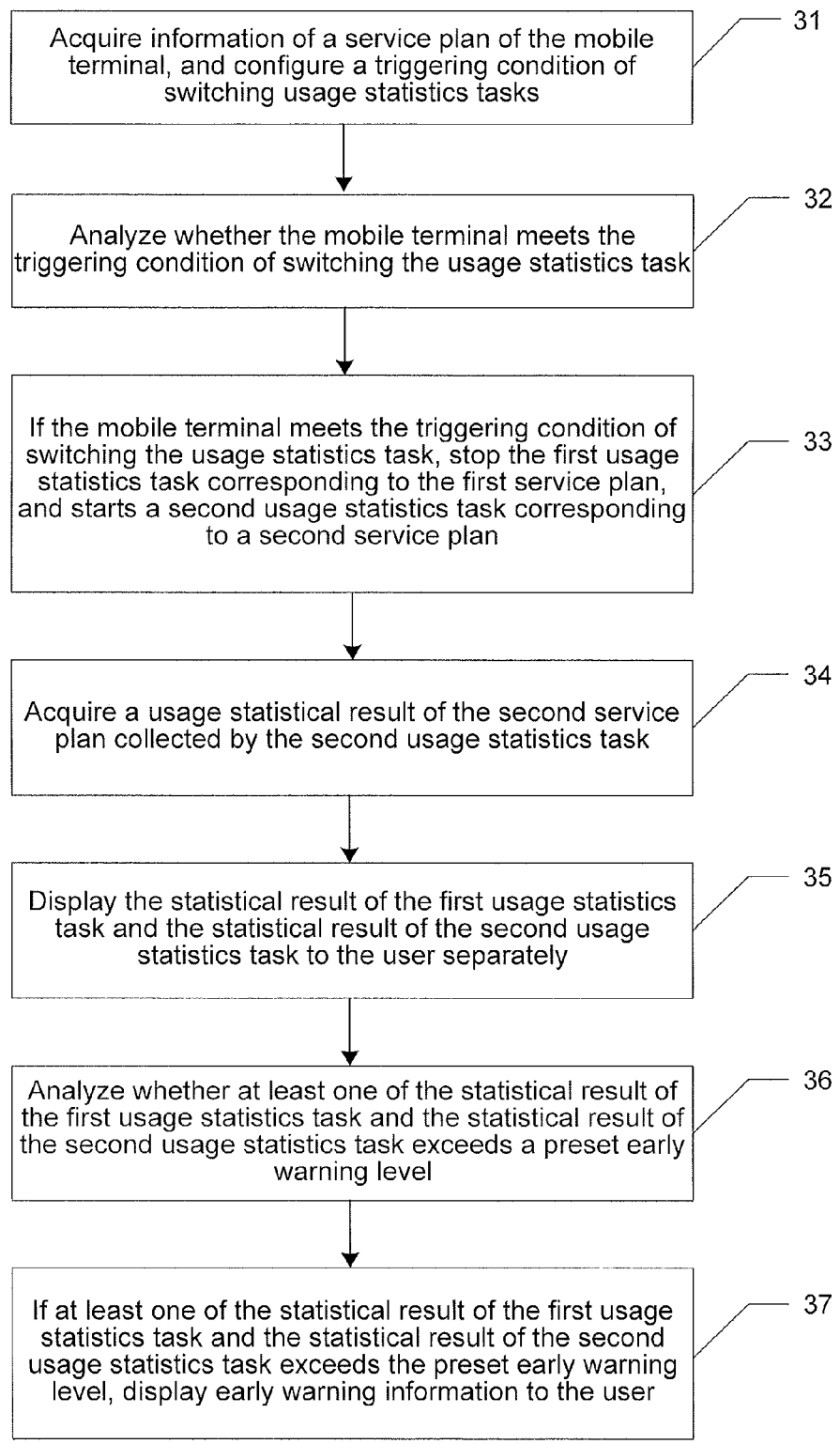
FIG. 3 is a flowchart of a method for monitoring service usage of the mobile terminal in accordance with some embodiments.

FIG. 3 is a flowchart of a method for monitoring service usage of a mobile terminal in accordance with some embodiments. As shown in FIG. 3, in some embodiments, the method for monitoring service usage of the mobile terminal includes the following steps.

Step 31: in accordance with some embodiments, the mobile terminal acquires information of a service plan of the mobile terminal, and configure a triggering condition of switching usage statistics tasks.

Figure 4:
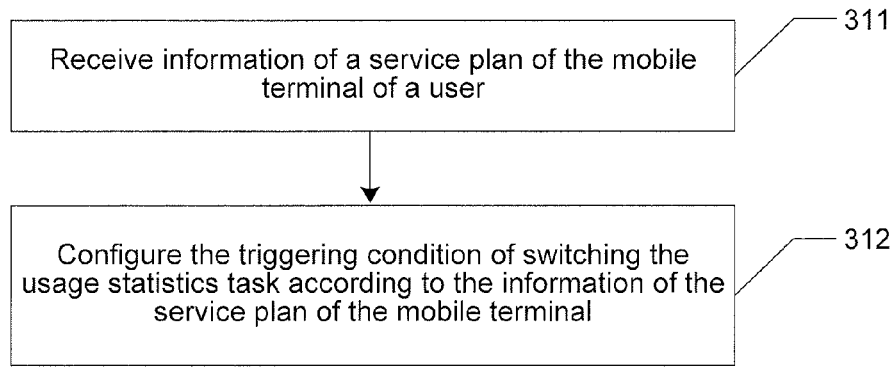
FIG. 4 is a detailed flowchart of the method for monitoring service usage of the mobile terminal in accordance with some embodiments.

Specifically, as shown in FIG. 4, Step 31 may include the following steps.

Step 311: in accordance with some embodiments, the mobile terminal receives information, input by the user, of a service plan of the mobile terminal.

Specifically, the mobile terminal may use a setting page to guide the user to add multi-package setting, and acquire specific condition information of the multiple packages, such as, types of the service plans of the mobile terminal, a billing period corresponding to each service plan, and rated total usage within each billing period.

Step 312: in accordance with some embodiments, the mobile terminal configures the triggering condition of switching the usage statistics task according to the information of the service plan of the mobile terminal.

Specifically, in some embodiments, the triggering condition is, according to the specific condition of each service plan, whether the mobile terminal meets a daily billing starting condition of the most preferential service plan. For example, the billing period for the first service plan each day is from 0:00 to 0:00 next day, and the billing period for the second service plan each day is from 0:00 to 0:00 next day; then, that the current system time of the mobile terminal reaching 0:00 is used as the triggering condition.

Step 32: in accordance with some embodiments, the mobile terminal analyzes whether the mobile terminal meets the triggering condition of switching the usage statistics task.

Figure 5:
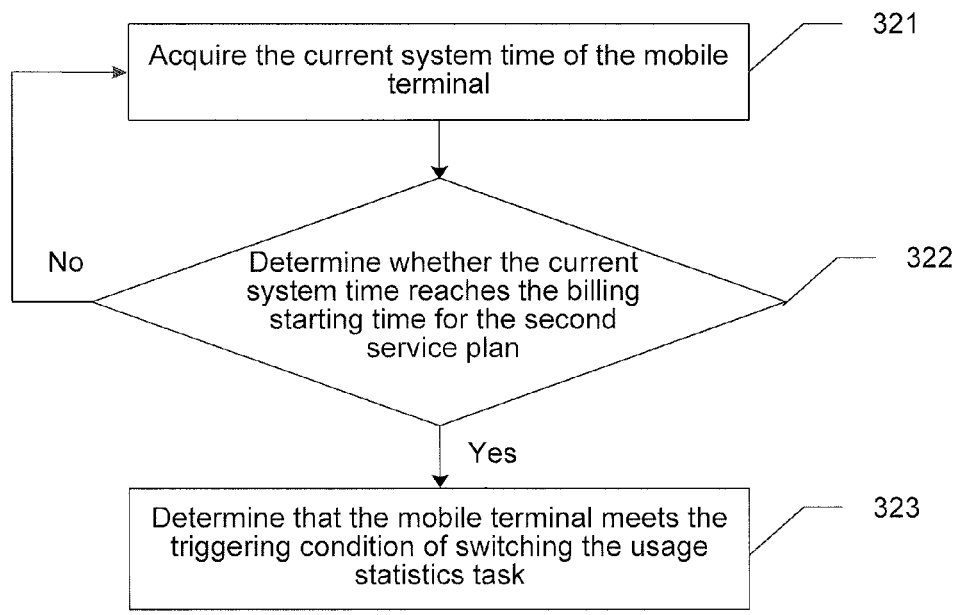
FIG. 5 is a detailed flowchart of the method for monitoring service usage of the mobile terminal in accordance with some embodiments.

Specifically, as shown in FIG. 5, Step 32 may include the following steps.

Step 321: in accordance with some embodiments, the mobile terminal acquires the current system time of the mobile terminal.

Step 322: in accordance with some embodiments, the mobile terminal determines whether the current system time reaches the billing starting time for the second service plan.

If yes, execute Step 323: in accordance with some embodiments, the mobile terminal determines that the mobile terminal meets the triggering condition of switching the usage statistics task.

Step 33: if the mobile terminal meets the triggering condition of switching the usage statistics task, the mobile terminal stops the first usage statistics task corresponding to the first service plan, and starts a second usage statistics task corresponding to the second service plan.

Step 34: the mobile terminal acquires a service usage statistical result of the second service plan collected by the second usage statistics task.

Step 35: the mobile terminal displays the statistical result of the first usage statistics task and the statistical result of the second usage statistics task to the user separately.

Step 36: the mobile terminal analyzes whether at least one of the statistical result of the first usage statistics task and the statistical result of the second usage statistics task exceeds a preset early warning level.

Since the upper limits of the service plans of different types are probably different, multiple early warning levels may be set according to the number of the service plans. The early warning level may be a certain fixed value set by the user, and may also be a value obtained through calculation by using a preset ratio and the upper limit of the service plan. For example, if the ratio corresponding to the first service plan is 90%, when the upper limit corresponding to the first service plan is 90 M, 90 M*90%=81 M may be used as the early warning level.

Specifically, the statistical result of the first usage statistics task is compared with the corresponding preset early warning level, and the statistical result of the second usage statistics task is compared with the corresponding preset early warning level.

Step 37: if at least one of the statistical result of the first usage statistics task and the statistical result of the second usage statistics task exceeds the preset early warning level, the mobile terminal displays early warning information to the user.

Specifically, in accordance with some embodiments, if at least one of the statistical results of the first usage statistics task and the second usage statistics task exceeds the corresponding preset early warning level, the mobile terminal displays the early warning information to the user. The early warning information includes usage of the service plan corresponding to the statistical value exceeding the preset early warning level, for example, the specific one or more service plans whose remaining traffics exceed the preset early warning levels, and the amount of the remaining traffic corresponding to the current service plan and exceeding the preset early warning level. By separate warning, the user can correctly know the specific service plan whose used service exceeds the early warning level, thereby improving the effectiveness of monitoring the service usage of the mobile terminal.

In accordance with some embodiments, when the mobile terminal meets a triggering condition of switching usage statistics tasks, the mobile terminal switches the execution between a first usage statistics task corresponding to a first service plan and a second usage statistics task corresponding to a second service plan, collects statistics on the usage of the first service plan and the second service plan, and displays statistical results to the user.

Figure 6:
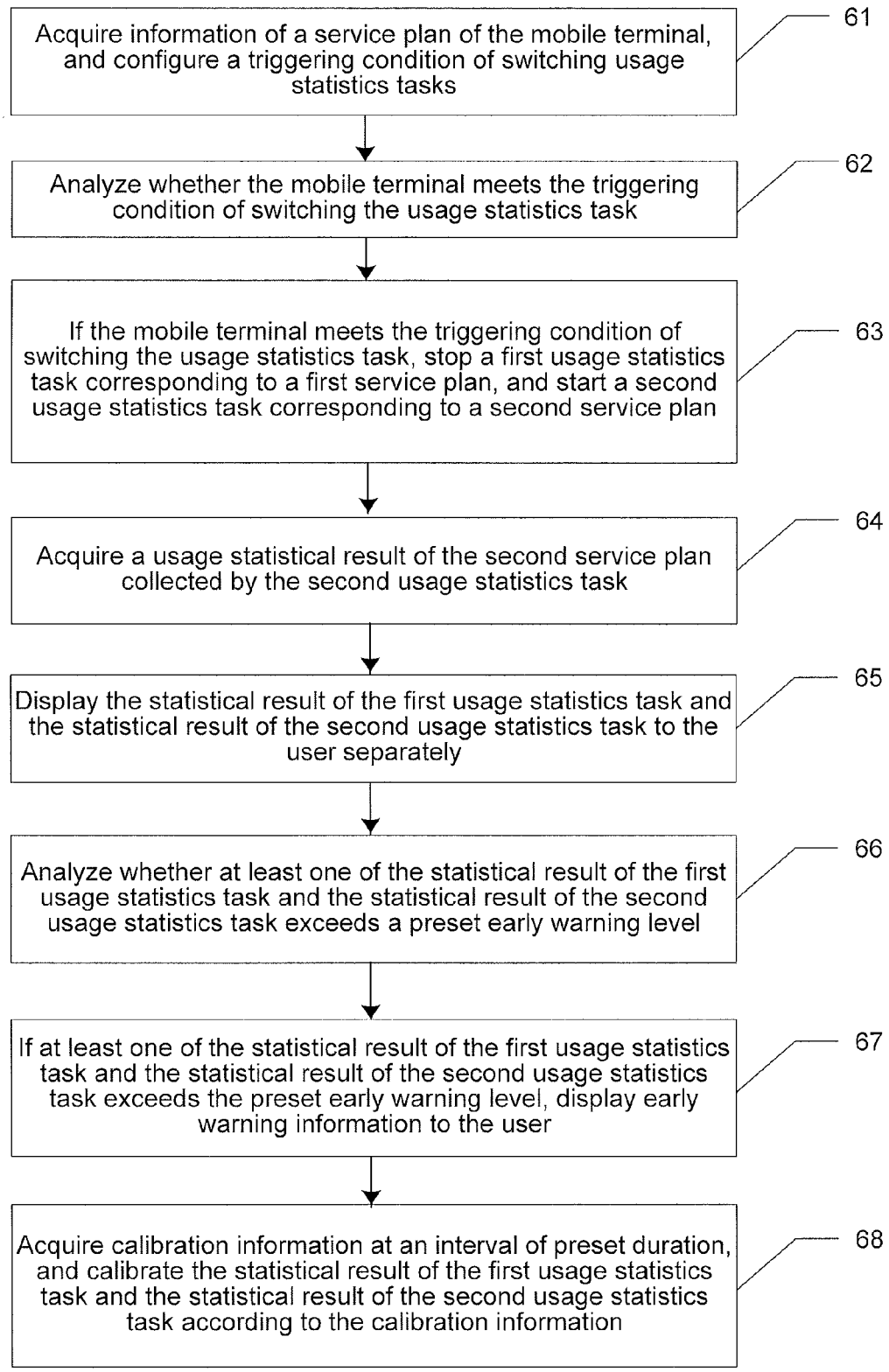
FIG. 6 is a flowchart of a method for monitoring service usage of the mobile terminal in accordance with some embodiments.

FIG. 6 is a flowchart of a method for monitoring service usage of a mobile terminal in accordance with some embodiments. As shown in FIG. 6, in some embodiments, the method for monitoring service usage of the mobile terminal includes the following steps.

Step 61: in accordance with some embodiments, the mobile terminal acquires information of a service plan of the mobile terminal, and configure a triggering condition of switching usage statistics tasks.

Figure 7:
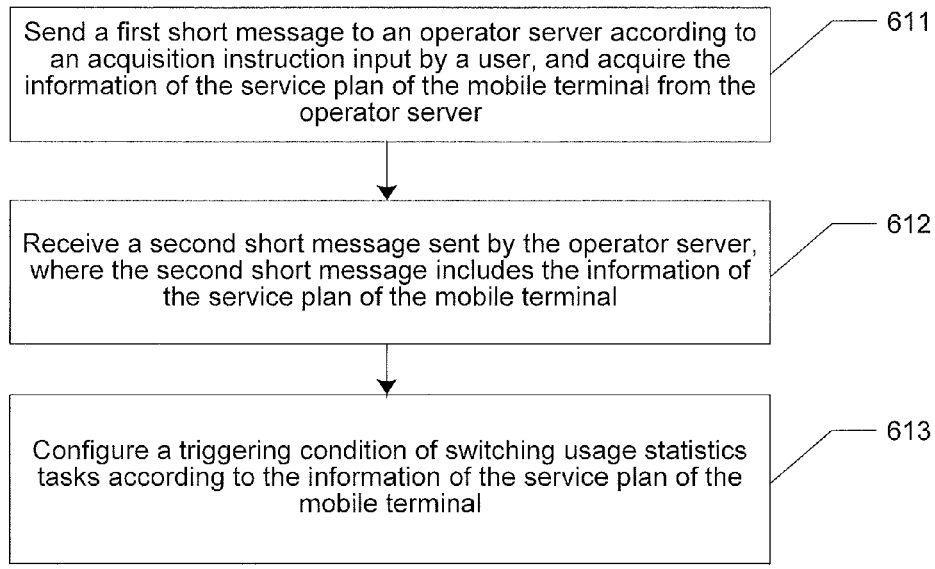
FIG. 7 is a detailed flowchart of the method for monitoring service usage of the mobile terminal in accordance with some embodiments.
Figure 8:
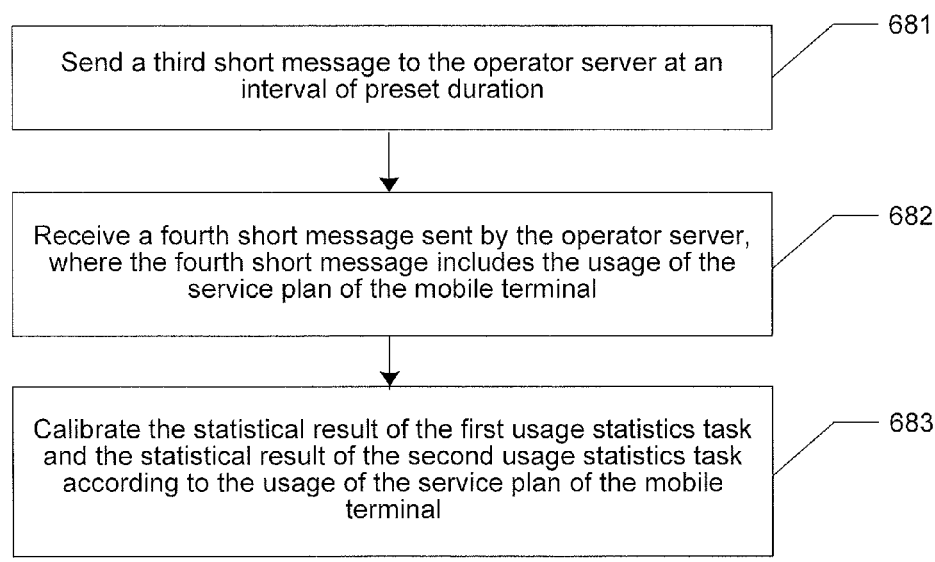
FIG. 8 is a detailed flowchart of the method for monitoring service usage of the mobile terminal in accordance with some embodiments.

Specifically, in some embodiments, as shown in FIG. 7, Step 61 may include the following steps.

Step 611: in accordance with some embodiments, the mobile terminal sends a first short message to an operator server according to an acquisition instruction input by a user, and acquire the information of the service plan of the mobile terminal from the operator server.

Specifically, in accordance with some embodiments, the mobile terminal receives the acquisition instruction input by the user, creates, according to the acquisition instruction, the first short message for acquiring the information of the service plan of the mobile terminal, and sends the short message to the operator server. The information of the service plan at least includes: types of the service plans of the mobile terminal, a billing period (billing starting time and billing terminating time each billing period) corresponding to each service plan, and the upper limit within each billing period.

Step 612: in accordance with some embodiments, the mobile terminal receives a second short message sent by the operator server, wherein the second short message includes the information of the service plan of the mobile terminal.

Specifically, the mobile terminal receives the second short message sent by the operator server, and extracts the information of the service plan of the mobile terminal that is included in the second short message.

Step 613: in accordance with some embodiments, the mobile terminal configures a triggering condition of switching usage statistics tasks according to the information of the service plan of the mobile terminal.

The triggering condition may include the case in which the current system time of the mobile terminal reaches the billing starting time for the second service plan.

Step 62: in accordance with some embodiments, the mobile terminal determines whether the mobile terminal meets the triggering condition of switching the usage statistics task.

Step 63: in accordance with some embodiments, the mobile terminal stops a first usage statistics task corresponding to a first service plan, and starts a second usage statistics task corresponding to a second service plan.

Step 64: in accordance with some embodiments, the mobile terminal acquires a service usage statistical result of the second service plan collected by the second usage statistics task.

Step 65: in accordance with some embodiments, the mobile terminal displays the statistical result of the first usage statistics task and the statistical result of the second usage statistics task to the user separately.

Step 66: in accordance with some embodiments, the mobile terminal analyzes whether at least one of the statistical result of the first usage statistics task and the statistical result of the second usage statistics task exceeds a preset early warning level.

Step 67: in accordance with some embodiments, if at least one of the statistical result of the first usage statistics task and the statistical result of the second usage statistics task exceeds the preset early warning level, the mobile terminal displays early warning information to the user.

Step 68: in accordance with some embodiments, the mobile terminal acquires calibration information at an interval of preset duration, and calibrates the statistical result of the first usage statistics task and the statistical result of the second usage statistics task according to the calibration information.

Specifically, as shown in FIG. 7, Step 68 may include the following steps.

Step 681: in accordance with some embodiments, the mobile terminal sends a third short message to the operator server at an interval of preset duration, to query the operator server for the usage of the service plan of the mobile terminal.

Specifically, in some embodiments, the mobile terminal may create, at an interval of preset duration (for example, 12 hours), the third short message for acquiring the information of the service plan of the mobile terminal, and send the third short message to the operator server. In some embodiments, according to an acquisition instruction input by the user, the mobile terminal may also create the third short message and send it to the operator server at any time, or may create the third short message and send it to the operator server at the preset fixed time each data (for example, 8:00 am each day), so as to acquire the usage of the service plan of the mobile terminal.

The usage of the service plan may at least include: types of the service plans of the mobile terminal and the corresponding remaining traffics.

Step 682: in accordance with some embodiments, the mobile terminal receives a fourth short message sent by the operator server, wherein the fourth short message includes the usage of the service plan of the mobile terminal.

Specifically, the mobile terminal receives the fourth short message sent by the operator server, and extracts the usage information of the service plan of the mobile terminal that is included in the fourth short message.

Step 683: in accordance with some embodiments, the mobile terminal calibrates the statistical result of the first usage statistics task and the statistical result of the second usage statistics task according to the usage of the service plan of the mobile terminal.

In accordance with some embodiments, when the mobile terminal meets a triggering condition of switching usage statistics tasks, the mobile terminal switches the execution between a first usage statistics task corresponding to a first service plan and a second usage statistics task corresponding to a second service plan, collects statistics on the usage of the first service plan and the second service plan, and displays statistical results to the user.

Figure 9:
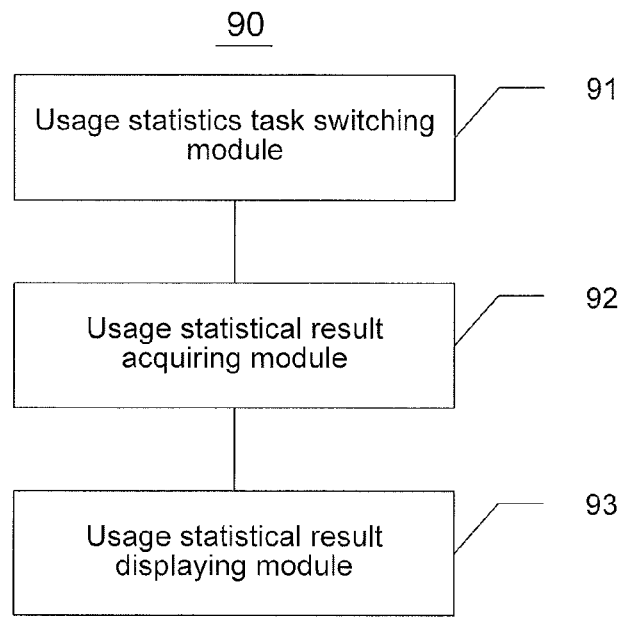
FIG. 9 is a schematic structural diagram of an apparatus for monitoring service usage of the mobile terminal in accordance with some embodiments.

FIG. 9 is a schematic structural diagram of an apparatus for monitoring service usage of a mobile terminal in accordance with some embodiments. The apparatus for monitoring service usage of the mobile terminal in this embodiment can be used to implement the method for monitoring service usage of the mobile terminal in accordance with some embodiments. In accordance with some embodiments, the apparatus 90 for monitoring service usage of the mobile terminal includes: a usage statistics task switching module 91, a service usage statistical result acquiring module 92, and a service usage statistical result displaying module 93.

The usage statistics task switching module 91 is used to stop a first usage statistics task corresponding to a first service plan and start a second usage statistics task corresponding to a second service plan.

The service usage statistical result acquiring module 92 is used to acquire a service usage statistical result of the second service plan collected by the second usage statistics task.

The service usage statistical result displaying module 93 is used to display the statistical results that are obtained by the service usage statistical result acquiring module 92.

Figure 10:
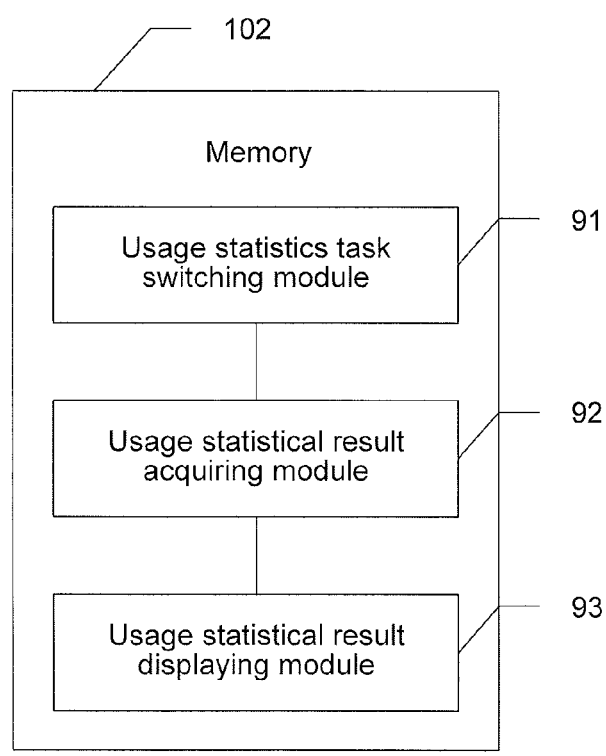
FIG. 10 is a schematic diagram showing a storage environment of the apparatus shown in FIG. 9.

In some embodiments, the foregoing modules are implemented by software code and are stored in the memory 102, as shown in FIG. 10. The foregoing modules may also be implemented by hardware such as an integrated circuit chip.

In accordance with some embodiments, when the mobile terminal meets a triggering condition of switching usage statistics tasks, the mobile terminal switches the execution between a first usage statistics task corresponding to a first service plan and a second usage statistics task corresponding to a second service plan, collects statistics on the usage of the first service plan and the second service plan, and displays statistical results to the user.

Figure 11:
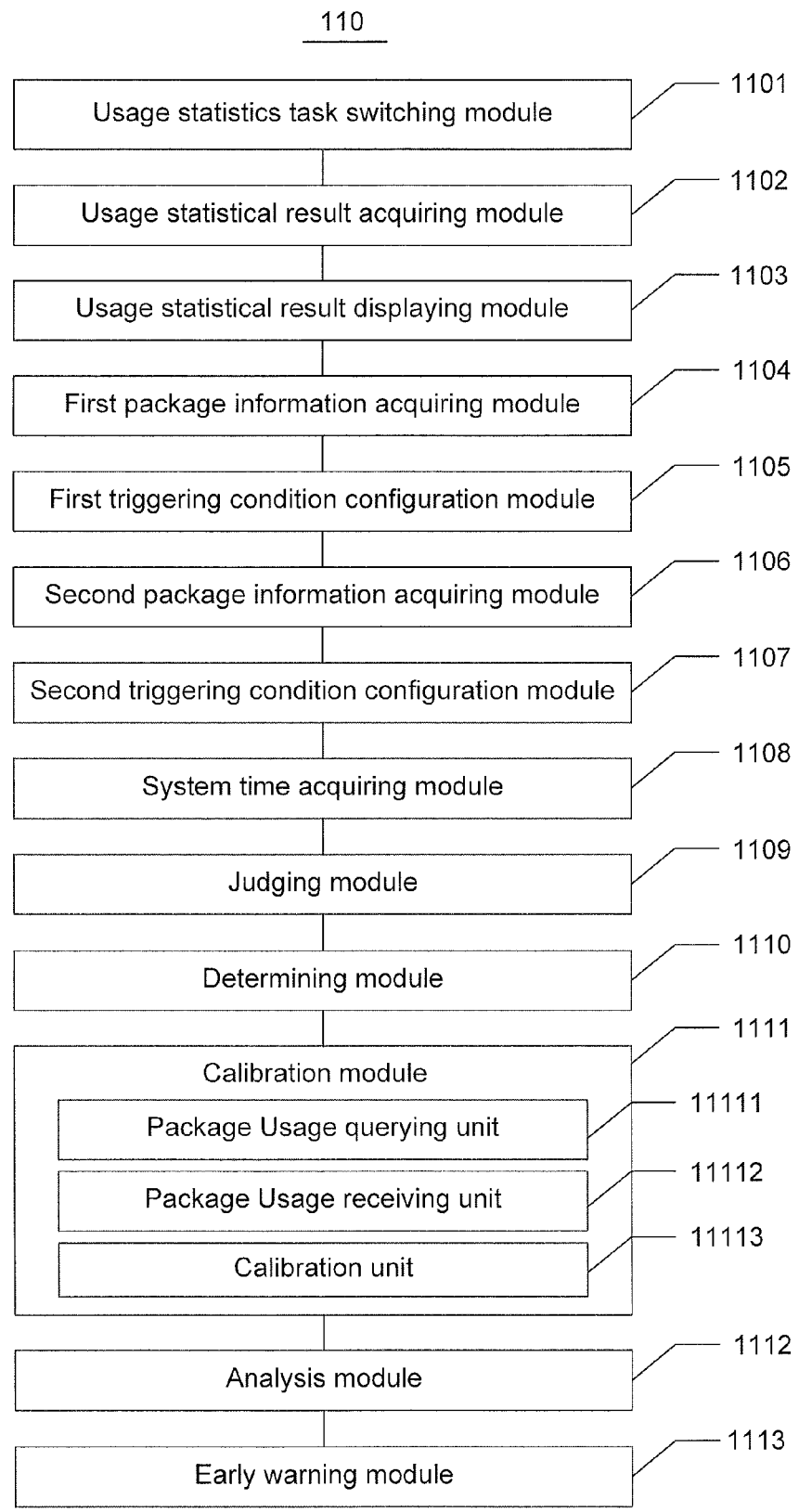
FIG. 11 is a schematic structural diagram of an apparatus for monitoring service usage of the mobile terminal in accordance with some embodiments.

FIG. 11 is a schematic structural diagram of an apparatus for monitoring service usage of a mobile terminal in accordance with some embodiments. As shown in FIG. 11, the apparatus 110 for monitoring service usage of the mobile terminal includes: a usage statistics task switching module 1101, a service usage statistical result acquiring module 1102, a service usage statistical result displaying module 1103, a first package information acquiring module 1104, a first triggering condition configuration module 1105, a second package information acquiring module 1106, a second triggering condition configuration module 1107, a system time acquiring module 1108, a judging module 1109, a determining module 1110, a calibration module 1111, an analysis module 1112, and an early warning module 1113.

The usage statistics task switching module 1101 is used to stop a first usage statistics task corresponding to a first service plan and start a second usage statistics task corresponding to a second service plan.

The service usage statistical result acquiring module 1102 is used to acquire a service usage statistical result of the second service plan collected by the second usage statistics task.

The service usage statistical result displaying module 1103 is used to display the statistical results that are obtained by the service usage statistical result acquiring module 1102.

The first package information acquiring module 1104 is used to receive information, input by the user, of a service plan of the mobile terminal.

The first triggering condition configuration module 1105 is used to configure, according to the information of the service plan of the mobile terminal that is obtained by the first package information acquiring module 1104, the triggering condition of switching the usage statistics task.

The second package information acquiring module 1106 is used to send a first short message to an operator server according to an acquisition instruction input by the user, and acquire the information of the service plan of the mobile terminal from the operator server, wherein the information of the service plan at least includes types of the service plans of the mobile terminal, a billing period corresponding to each service plan, and the upper limit within each billing period. The second package information acquiring module is further used to receive a second short message sent by the operator server, wherein the second short message includes the information of the service plan of the mobile terminal.

The second triggering condition configuration module 1107 is used to configure, according to the information of the service plan of the mobile terminal that is obtained by the second package information acquiring module, the triggering condition of switching the usage statistics task.

The system time acquiring module 1108 is used to acquire the current system time of the mobile terminal.

The judging module 1109 is used to determine whether the current system time acquired by the system time acquiring module reaches the billing starting time for the second service plan.

The determining module 1110 is used to determine that the mobile terminal meets the triggering condition of switching the usage statistics task.

The calibration module 1111 includes a package usage querying unit 11111, a package usage receiving unit 11112, and a calibration unit 11113. The package usage querying unit 11111 is used to send a third short message to the operator server at an interval of preset duration, and query the operator server for the usage of the service plan of the mobile terminal, wherein the usage at least includes types of the service plans of the mobile terminal and the corresponding remaining traffic; The package usage receiving unit 11112 is used to receive a fourth short message sent by the operator server, wherein the fourth short message includes the usage of the service plan of the mobile terminal; and the calibration unit 1113 is used to calibrate the statistical result of the first usage statistics task and the statistical result of the second usage statistics task according to the usage of the service plan of the mobile terminal that is received by the package usage receiving unit 11112.

The analysis module 1112 is used to analyze whether at least one of the statistical result of the first usage statistics task and the statistical result of the second usage statistics task exceeds a preset early warning level.

The early warning module 1113 is used to display early warning information to the user, wherein the early warning information includes the usage of the service plan corresponding to the statistical result exceeding to the preset early warning level.

In accordance with some embodiments, when the mobile terminal meets a triggering condition of switching usage statistics tasks, the mobile terminal switches the execution between a first usage statistics task corresponding to a first service plan and a second usage statistics task corresponding to a second service plan, collects statistics on the usage of the first service plan and the second service plan, and displays statistical results to the user.

Figure 12:
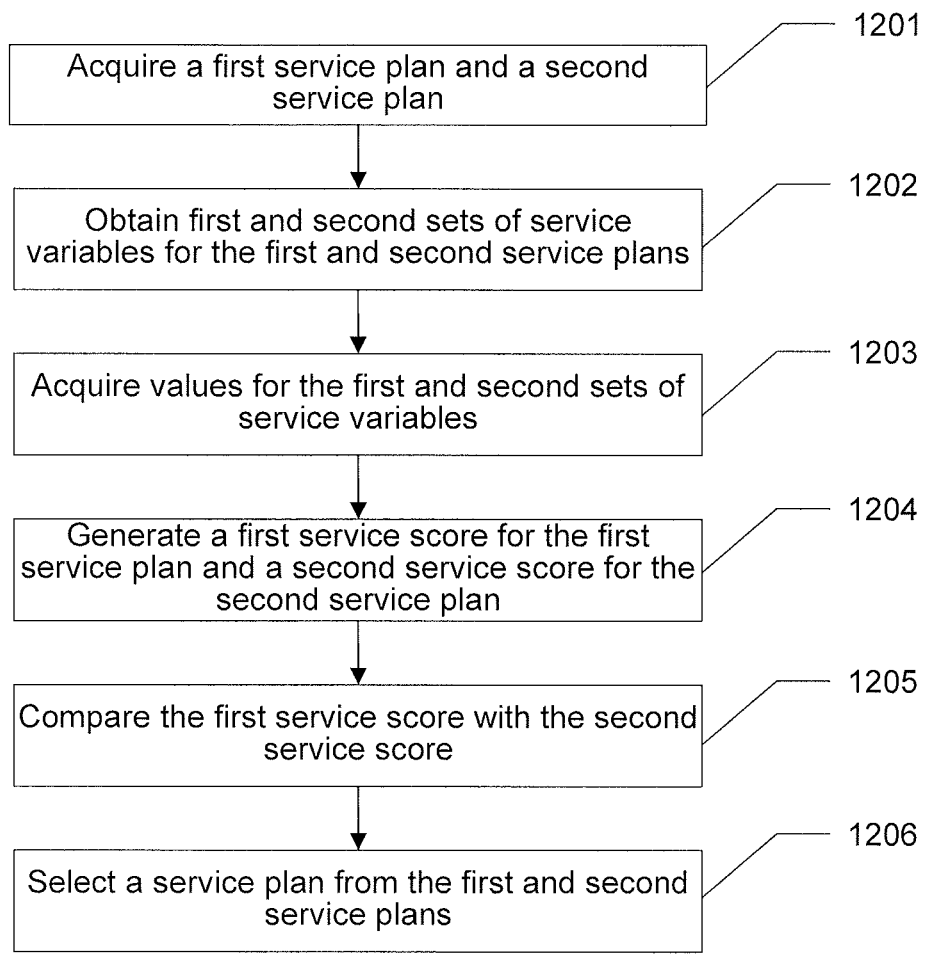
FIG. 12 is a flowchart of a method for monitoring service usage in accordance with some embodiments.

FIG. 12 is a flowchart of a method of monitoring service usage in accordance with some embodiments. In some embodiments, the method is performed at a device of having one or more processors and memory for storing one or more programs to be executed by the one or more processors.

In accordance with some embodiments, in the step 1201, the device acquires information of a first service plan and a second service plan, each service plan being currently registered with a plurality of service providers.

In some embodiments, a service plan is associated with a contract, a fee arrangement, a pre-arrangement to access certain service, a stage in a fee schedule, a method of calculating fees, a phone number, an account, and/or any arrangement with a service provider with regard to fees and features of voice and data service. For example, a mobile phone may have two telephone numbers that are provided by two telecom carriers. Each telephone number corresponds to at least one service plan. For another example, a mobile phone may have two service plans. Plan A provides 1000 minutes national phone call and 500 M data downloading and uploading. Plan B provides 0.3-cent-per-minute rate for IP based phone calls and 1.2-cent-per-minute-rate for IP based international phone calls. For yet another example, Plan A for a mobile phone provides 500 minutes phone call for $5. Plan B charges $20 each month and provides unlimited incoming phone calls, 400 minute outgoing calls, and 300 M data transmission. The user can choose Plan A or Plan B before using any service. For still another example, a user signs a contract to with a telecom service provider. The contract charges $5 for stage 1, providing data usage up to 100 M, charges additional $15 for stage 2, providing data usage up to 500 M, and charges additional $45 for stage 3, providing data usage up to 3000 M. The device treats the stages 1, 2 and 3 as service plan A, B and C even though the user only signs up for one service contract with the service provider. In some embodiments, a service plan is jointly provided by more than one service provider. For example, a service provider may cooperate with others to cover international roaming in another country.

In some embodiments, the device acquires service plan information by receiving user input of the service plan information. For example, the device may provide an interface, asking the user to enter information of the service plan. In some embodiments, the device acquires service plans by receiving service plan information from the service plan providers. For example, the device may send a request to a service plan management server and receives service plan information from the server.

In some embodiments, the service plan information includes a fee structure, available networks, marginal rates, service cycle (payment cycle, billing cycle, or payment period), discount information, type of service, quality of service, and/or any other information that may interest a user in choosing a service plan.

In accordance with some embodiments, in the step 1202, in accordance with the information of the first and second service plans, the device obtains first and second sets of service variables for the first and second service plans, respectively.

In some embodiments, some of the first and second set variables are extracted from the information of the first and second service plans. For example, these variables include marginal rate, start and end time of free phone call hours, the upper limit of data usage for a particular rate, rates in different locations, start and end time of service cycles, extra fees, penalties, discounts, networks available through the market plans, etc. And some of the variables are obtained because they are related to the information of the first and/or second service plans. For example, these variables include current time, current location of the device, total data usage in the current service cycle, total phone call minutes used in the current service cycle, networks that are currently available, etc. In some embodiments, the first and second sets of service variables include one or more circumstantial variables and historical variables. Circumstantial variables include current time, currently available networks, signal strength, current location, etc. Historical variables include use pattern in previous service cycles, data usage in the current service cycle, total phone call minutes in the three service cycle, average data use in each day of a week, etc. In some embodiments, the variables also include derivative variables, which are calculated and/or transformed from other variables.

In accordance with some embodiments, in the step 1203, the device acquires one or more respective values for at least one of the first and second sets of service variables.

In some embodiments, the values of derivative variables are calculated and/or transformed from values of other variables. In some embodiments, calculating a first value for a first variable in accordance with a second value for a second variable, wherein the first variable and the second variable belong to a same set of service variables. For example, the device projects future phone call minutes in the remaining month (the first variable) based on the average daily phone call minutes in previous three months (the second variable) in the same service plan. For another example, the device acquires the remaining free data usage (the first variable) by deducting the total data usage in the current service cycle (the second variable) from the total free data usage (the third variable) in the same data plan.

In some embodiments, acquiring the one or more respective values for the at least one of the first and second sets of service variables comprises: prompting a user to enter a prediction of a value for a first variable. For example, a service plan has different upper limits for the in-state and out-of-state data usage. In order to project the total data usage out-of-state, the device calculates the average daily data usage when the user travels out-of-state and asks the user to estimate how long he will stay out of home state for the rest of the month.

In accordance with some embodiments, in the step 1204, in accordance with the acquired values, the device generates a first service score for the first service plan and a second service score for the second service plan.

A service score can be a number that describes an aspect of a service plan, e.g., the current rate for every minute of phone call, the remaining minutes to hit a ceiling, a bandwidth of a data connection, or a composite index. In some embodiments, a service score can be anything comparable between the two service plans. For example, for a mobile phone, Plan A is a first stage of data usage, when the user will be charged for totally $10 for up to 200 M data usage within a month; Plan B is a second stage of data usage, when the user will be charged for totally $20 for up to 500 M data usage; Plan C is a third stage, when the user will be charged for $40 for up to 1500 M data usage. In a most simple form, a service score for Plan A is $10, the one for Plan B is $20 and the one for Plan C is $40. In a more complex form, another service score is likelihood that by the end of the current month, the data usage will fall into stage A, B or C. Based on previous data usage pattern and the data usage of the current month, the device generates likelihood for each service plan as the service score. When a user has used 250 M data by the 20th day of the service cycle of April, the service scores for Plans A, B and C may be 0%, 89%, and 11%. In an even more complicated form, a third type of service score is a recommendation score. The higher the recommendation score, the stronger that the device urges the user to choose. For example, in the last day of the service cycle of April, the user has 30 M data left in Plan B before hitting Plan C. The device may give a recommendation score 0 to Plan A, a recommendation score 95 to Plan B and a recommendation score 7 to Plan C. Such recommendation scores reflect that there is no possibility of returning to Plan A already; that the user should try to stick with Plan B since it is the last day with plenty of data left in Plan B; that the user should try to avoid Plan C which will incur $20 extra charge than Plan B. In some embodiments, the device generates more than one service score for a service plan.

In some embodiments, a service score, such as a composite index or a recommendation score, can be calculated differently in each service plan. The device obtains a first calculating method for the first service score and a second calculating method for the second service score; and calculates in accordance with the first and second calculating methods. For example, a mobile phone has Plan A which has 200 free phone call minutes left before hitting $20 charge and Plan B which charges a 0.3 cent for every minute. The $10 charge, 200 minutes, and 0.3 cent/minute are not directly comparable with each others. However, by analyzing some historical variables, the device may get an approximate value of a service score, which is expected monetary value of 10 minute phone call. For example, the device concludes that talking 10 minutes with Plan A may increase the chance of hitting the $20 charge by 2% because there may be incoming calls through Plan A which are not controlled by the user. 2% of $20 translates into 40 cents. The device also concludes that 10 minutes of 0.3 cent/minute is worthy of 3 cents. Therefore, Plan A has a higher service score than Plan B, which is a reason to select Plan B in this scenario.

In some embodiments, the device displays the first service score and the second service score to the user so that user can make an informed choice. In some embodiments, the device will only use service scores to perform the next steps.

In accordance with some embodiments, in the step 1205, the device compares the first service score with the second service score. In some embodiments, when there are several service scores in each service plan, the device only compare one service score.

In accordance with some embodiments, in the step 1206, in accordance with the first service score with the second service score, the device selects a service plan from the first and second service plans.

In some embodiments, the device selects a service plan based on a set of predetermined criteria. In some embodiments, in determining the set of the criteria, the prompts a user to enter a preference for choosing service plans. For example, a user can select "maximum quality," "minimum cost," "balanced approach," "light data usage," etc. The preference influences how the device selects service plans in accordance with service scores. In some embodiments, a user can choose to sets up the criteria with more detail. For example, the user can set up the criteria to be that always selecting IP-based phone call in international phone calls, unless there is 120 free regular phone call minutes left in another service plan. In some embodiments, the current service plan is based on the service usage and can only be determined at the end of the service cycle. For example, a device has two service plans: Plan A is $5 for 200 M data usage and Plan B is 2 cent for every megabyte data usage after the initial 200 M data usage. The device may select a service plan that is predicated to be the most likely scenario by the end of the service cycle.

In some embodiments, after selecting the respective service plan, the device adopts a method in accordance with the selected service plan to calculate service fee. In some embodiments, total service fee in a service cycle is calculated in accordance with the first service plan if service usage in the service cycle meets first predetermined billing criteria. In some embodiments, the device predicts which service plan will be used in calculating the total service fee of the service cycle in accordance with the respective values of a plurality of the first and second sets of service variables; and in accordance with the prediction, calculating the total service fee of the service cycle. For example, the user signs up a contract with a wireless internet service provider which has three levels of rates, each level corresponding to a service plan. For the first 200 minutes of internet access in a week, the rate is 1 cent per minute (Plan A); for the next 500 minutes, the rate is 0.7 cent per minute (Plan B); for the all the time exceeding 1000 minutes, the rate is 0.4 cent per minute (Plan C). After projecting that the user will use the wireless internet service for 1200 minutes by the end of the weekly service cycle, the device also calculates a total service fee based on the service plan information corresponding to all three service plans.

In some embodiments, the device further generates service fee information in a current service cycle and displays the service fee information. In some embodiments, service fee information includes anything related to fees, such as current data usage, remaining minutes, current rate, remaining data usage before increasing the rate, marginal rate for the current service usage. In the example in the preceding paragraph, after projecting that the use will use internet for 1200 minutes in the current week, the device uses the 0.4 cent per minutes as the marginal rate of the internet access. However, when the user adopts a suggestion of turning off a data consuming application, e.g., YouTube, the projected time decreases to 900 minutes. The device calculates the total service fee based on the service plan information corresponding to the first two levels of rates. Therefore, the user is able to see how much money is saved by changing behavior. In addition, because the service plan has changed, the calculated marginal rate increases from 0.4 cent/minute to 0.7 cent/minute. By displaying the projected marginal rate, the user can make an informed decision on whether to use a particular application.

In some embodiments, after selecting the respective service plan, the device automatically uses the selected service plan to provide service. For example, a smart phone detects two data networks that can be connected with. Network A corresponds to Plan A, which has abundant data usage amount left before incurring additional cost. Network B corresponds to Plan B, which charges 1.5 cent for every megabyte of data downloading or uploading. Based on analysis of past service usage pattern and service consumption in the current payment cycle, the smart phone determines that Plan A is more economical than Plan B and automatically connects with Plan A.

In some embodiments, after selecting the respective service plan, the device displays a suggestion to a user with regard to using service and/or managing the device. In some embodiments, the suggestion could be switching from the first plan to the second plan, or using a particular plan. For example, when a user tries to make an international phone call, the device displays three options, making a regular phone call (Plan A provided by telecom provider 1), making an IP based call (Plan B provided by telecom provider 1), or calling through an application (Plan C provided by internet provider 2 and software provider 3). The device may display some service scores of the service plans A, B and C. For example, the device displays the remaining minutes of plan A, marginal cost of plan B, and the estimated data cost of plan C. The device may also display some quality related service scores, e.g., the past average connecting time from dialing to reaching the other phone, the past frequency of dropping offline when talking with each service plan, the signal strength of the networks used by each service plan. At last, the device displays a suggestion to the user with regard to which service plan the user should use to make a call based on the service scores of service plans.

In some embodiments, the suggestion, when adopted, is one of a plurality of actions that switch the device from the first service plan to the second service plan. For example, the current projection is that the device will use data service to an amount that triggers a more expensive Plan B. The suggestion may be to turn off a particular app so that the total service is calculated by a cheaper Plan A. Therefore, turning off the app is one of the several data saving measures that switch the device from the currently projected Plan B into a cheaper Plan A.

In some embodiments, the device adopts a reminder policy in accordance with the selected service plan. For example, a user has two telephone numbers on the same mobile phone, each telephone number corresponding to an independent service plan. When the user is using the telephone number 1, the device adopts a reminder policy that is based on the service plan corresponding to the telephone number 1. In some embodiments, the device determines a warning level of service usage in accordance with the selected service plan; and reminds a user when the warning level is reached. For example, in a three-fee-level scenario discussed above, Plan A is a first stage of data usage, when the user will be charged for totally $10 for up to 200 M data usage within a month; Plan B is a second stage of data usage, when the user will be charged for totally $20 for up to 500 M data usage; Plan C is a third stage, when the user will be charged for $40 for up to 1500 M data usage. After the device predicts that the user will use 400 M data and selects Plan B, the device adopts a reminder policy that reminds the user when 475 M data is adopted. In some embodiments, when the reminder policy is selected because it is the most likely scenario, the device changes a reminder policy when the service usage is impossible to meet the first predetermined billing criteria but is still possible to meet the second predetermined billing criteria so that the device reminds the user to use service in a way that meets the second predetermined billing criteria. For example, in the above example, when the user has used 501 M data, the device switches from Plan B to Plan C and determines a warning level at 1450 M data usage.

In general, the technology is more useful for a user when there are more service plans registered with the device and more complexity in each service plan. Imagine a business person from the USA is traveling around Europe. The business person talks with people in other countries on daily basis. The business person has signed a contract with a telecom carrier in the USA and relies on the cooperators of the US telecom carrier in each European country to provide service. As it happens, the cooperator service providers all have different fee structures and rates for phone calls and internet access. Each service has different rate based on the time of the day. For each conversation with people in other countries, the business person has the options of regular phone call, IP based call, video conference through two applications, voice call through the two applications. Each option has different quality and rates. For regular calls and IP-based calls, talking with people in different foreign countries also has different rates. The business person stays in hotels and each hotel has its internet access with its own rates or complimentary. Therefore, to even try to optimize his choices, the business person will fall into a myriad of choices and have to consider numerous factors. The technology may help the business person to simplify his decision-making by narrowing down his options. In addition, the technology may make decisions for the business person, based on some guidelines previously entered. At last, the technology helps the business person to manage the mobile phone in a foreign environment to avoid unintended charges. As can be seen in various embodiments, very often selecting of service plans involves certain degree of prediction of future use and cannot be completely accurate. However, it is still helpful for the users to have the device to take into account of all complex variables and provides guidance as best as possible.

Figure 13:
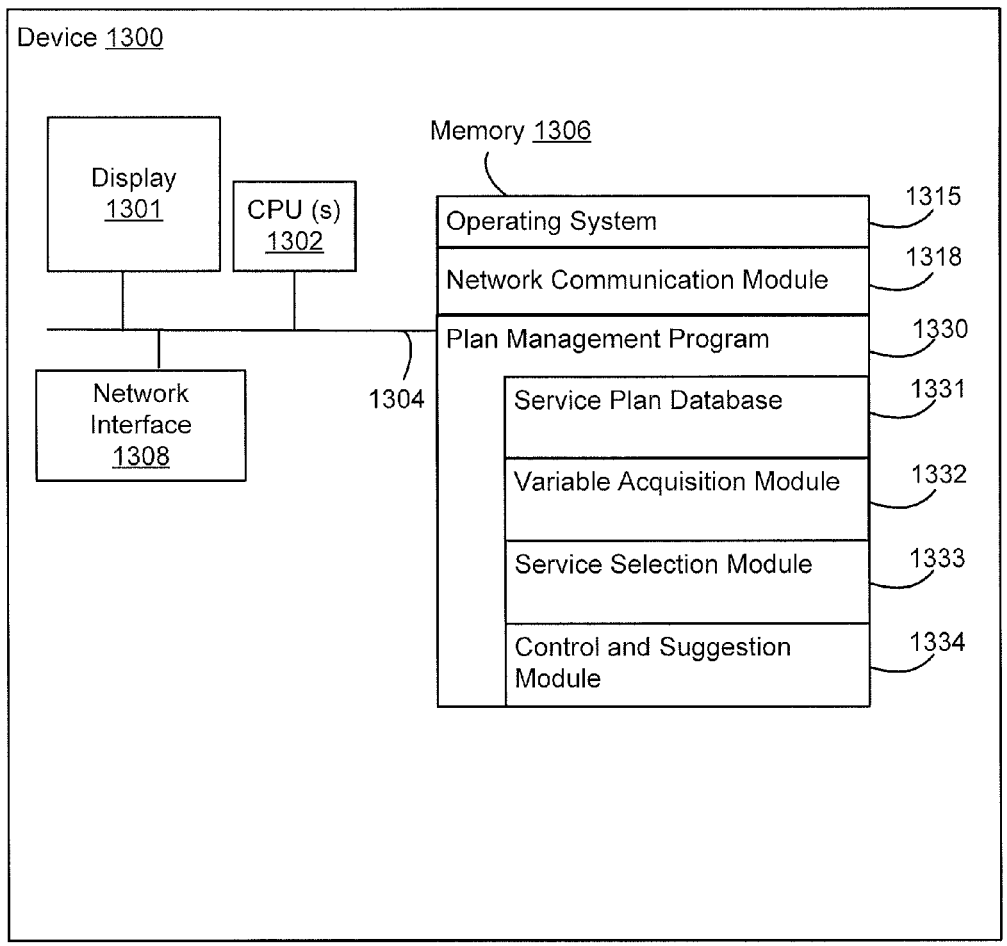
FIG. 13 is a diagram of an example implementation of a device in accordance with some embodiments.

FIG. 13 is a diagram of an example implementation of a device 1300 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the device 1300 includes one or more processing units (CPU's) 1302, one or more network or other communications interfaces 1308, a display 1301, memory 1306, and one or more communication buses 1304 for interconnecting these and various other components. The communication buses may include circuitry (sometimes called a chipset) that interconnects and controls communications between system components. The memory 1306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1306 may optionally include one or more storage devices remotely located from the CPU(s) 1302. The memory 1306, including the non-volatile and volatile memory device(s) within the memory 1306, comprises a non-transitory computer readable storage medium.

In some implementations, the memory 1306 or the non-transitory computer readable storage medium of the memory 1306 stores the following programs, modules and data structures, or a subset thereof including an operating system 1316, a network communication module 1318, and a plan management program 1330.

In accordance with some embodiments, the operating system 1316 includes procedures for handling various basic system services and for performing hardware dependent tasks.

In accordance with some embodiments, the network communication module 1318 facilitates communication with other devices via the one or more communication network interfaces 1308 (wired or wireless) and one or more communication networks, such as the internet, other wide area networks, local area networks, metropolitan area networks, and so on.

In accordance with some embodiments, the plan management program 1330 is configured to select a service plan, display suggestions, service information and score, and automatically switches a service. In some embodiments, the plan management program 1330 comprises a service plan database 1331, a variable acquisition module 1332, a service selection module 1333 and a control and suggestion module 1334. In some embodiments, the service plan database 1331 is configured to store service plan information, some of which are historical variables to be retrieved by the variable acquisition module 1332. In some embodiments, the variable acquisition module 1332 is configured to obtain service variables for service plans and acquire one or more respective values for the service variables. The variable acquisition module 1332 is configured to retrieve information from the service plan database 1331 and other modules of the device 1300, e.g., acquiring available network from the network communication module 1318. In some embodiments, the service selection module 1333 is configured to generate service scores for service plans, compare service scores of different plans and select a service plan from all available ones. In some embodiments, the control and suggestion module 1334 is configured to receive service plan selection from the service selection module 1333, instruct other modules to switch service plans, change reminder policies of service plans, suggest actions to the user, and display service information and scores. The working process of the plan management program 1330 is illustrated in other Figures, especially FIG. 12, and will not be repeated here.

While particular embodiments are described above, it will be understood it is not intended to limit the technology to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:
1. A method of monitoring service usage, comprising:
at a device of having one or more processors and memory for storing one or more programs to be executed by the one or more processors:
acquiring respective service plan information of a first service plan and a second service plan for a service offered by one or more service providers, the respective service plan information for each of the first and second service plans including a respective set of service variables, the respective sets of service variables further including one or more circumstantial variables and one or more historical variables;
acquiring respective values for the respective sets of service variables for the first and second service plans based on actual service usage associated with a user;

in accordance with the acquired respective values of the corresponding one or more circumstantial variables and the corresponding one or more historical variables, generating a first service score for the first service plan and a second service score for the second service plan;

in accordance with the first service score and the second service score, selecting a respective one of the first and second service plans for at least one of usage recommendation or fee calculation for subsequent use in a current service cycle; and after selecting the respective service plan, automatically using the selected service plan to provide service according to the selected service plan.

2. The method of claim 1, wherein in accordance with the first service score and the second service score, selecting the service plan from the first and second service plans comprising:

comparing the first service score with the second service score; and selecting the respective service plan with the respective more preferable service score.

3. The method of claim 1, wherein in accordance with the first service score and the second service score, selecting the service plan from the first and second service plans comprising:

predicting which service plan will be used for calculating service fee of a service cycle in accordance with the first service score and the second service score; and selecting the service plan that is predicted to have the highest likelihood to be used for calculating the service fee of the service cycle.

4. The method of claim 1, further comprising:

adopting a usage reminder policy in accordance with the selected service plan.

5. The method of claim 4, wherein adopting the usage reminder policy in accordance with the selected service plan comprises:

determining a warning level of service usage in accordance with the selected service plan; and reminding a user when the warning level is reached.

6. The method of claim 1, wherein acquiring the respective values for the respective sets of service variables for the first and second service plans based on the actual service usage associated with the user comprises:

prompting a user to enter a prediction of a value for a first variable.

7. A device of monitoring service usage, comprising:

one or more processors; and memory storing one or more programs for execution by the one or more processors, the one or more programs including instructions for:

acquiring respective service plan information of a first service plan and a second service plan for a service offered by one or more service providers, the respective service plan information for each of the first and second service plans including a respective set of service variables, the respective sets of service variables further including one or more circumstantial variables and one or more historical variables;

acquiring respective values for the respective sets of service variables for the first and second service plans based on actual service usage associated with a user;

in accordance with the acquired respective values of the corresponding one or more circumstantial variables and the corresponding one or more historical variables, generating a first service score for the first service plan and a second service score for the second service plan;

in accordance with the first service score and the second service score, selecting a respective one of the first and second service plans for at least one of usage recommendation or fee calculation for subsequent use in a current service cycle; and after selecting the respective service plan, automatically using the selected service plan to provide service according to the selected service plan.

8. The device of claim 7, wherein in accordance with the first service score and the second service score, selecting the service plan from the first and second service plans comprising:

comparing the first service score with the second service score; and selecting the respective service plan with the respective more preferable service score.

9. The device of claim 7, wherein in accordance with the first service score and the second service score, selecting the service plan from the first and second service plans comprising:

predicting which service plan will be used for calculating service fee of a service cycle in accordance with the first service score and the second service score; and selecting the service plan that is predicted to have the highest likelihood to be used for calculating the service fee of the service cycle.

10. The device of claim 7, the one or more programs further include instructions for:

adopting a usage reminder policy in accordance with the selected service plan.

11. The device of claim 10, wherein adopting the usage reminder policy in accordance with the selected service plan comprises:

determining a warning level of service usage in accordance with the selected service plan; and reminding a user when the warning level is reached.

12. The device of claim 7, wherein acquiring the one or more respective values for the at least one of the first and second sets of service variables comprises:

prompting a user to enter a prediction of a value for a first variable.

13. A non-transitory computer readable storage medium having instructions stored thereon, the instructions, when executed by one or more processors, cause the processors to perform operations comprising:

acquiring respective service plan information of a first service plan and a second service plan for a service offered by one or more service providers, the respective service plan information for each of the first and second service plans including a respective set of service variables, the respective sets of service variables further including one or more circumstantial variables and one or more historical variables;

acquiring respective values for the respective sets of service variables for the first and second service plans based on actual service usage associated with a user;

in accordance with the acquired respective values of the corresponding one or more circumstantial variables and the corresponding one or more historical variables, generating a first service score for the first service plan and a second service score for the second service plan;

in accordance with the first service score and the second service score, selecting a respective one of the first and second service plans for at least one of usage recommendation or fee calculation for subsequent use in a current service cycle; and after selecting the respective service plan, automatically using the selected service plan to provide service according to the selected service plan.

14. The non-transitory computer readable storage medium of claim 13, wherein in accordance with the first service score and the second service score, selecting the service plan from the first and second service plans comprising:

comparing the first service score with the second service score; and selecting the respective service plan with the respective more preferable service score.

15. The non-transitory computer readable storage medium of claim 13, wherein in accordance with the first service score and the second service score, selecting the service plan from the first and second service plans comprising:

predicting which service plan will be used for calculating service fee of a service cycle in accordance with the first service score and the second service score; and selecting the service plan that is predicted to have the highest likelihood to be used for calculating the service fee of the service cycle.

16. The non-transitory computer readable storage medium of claim 13, wherein the instructions, when executed by one or more processors, further cause the processors to perform operations comprising:

adopting a usage reminder policy in accordance with the selected service plan.

17. The non-transitory computer readable storage medium of claim 16, wherein adopting the usage reminder policy in accordance with the selected service plan comprises:

determining a warning level of service usage in accordance with the selected service plan; and reminding a user when the warning level is reached.

* * * * *